United States Patent [19]

Ikuta

[11] Patent Number: 5,577,680
[45] Date of Patent: Nov. 26, 1996

[54] BAITCASTING REEL HAVING A PIVOTABLE THUMB REST

[75] Inventor: Takeshi Ikuta, Sakai, Japan

[73] Assignee: Shimano Inc., Sakai, Japan

[21] Appl. No.: 542,219

[22] Filed: Oct. 26, 1995

Related U.S. Application Data

[63] Continuation of Ser. No. 130,455, Oct. 1, 1993, abandoned.

[30] Foreign Application Priority Data

Oct. 15, 1992 [JP] Japan ................... 4-071764 U

[51] Int. Cl.⁶ .................................................. A01K 89/015
[52] U.S. Cl. ........................... 242/313; 242/288; 242/315
[58] Field of Search ..................................... 242/310, 312, 242/313, 288, 314, 315

[56] References Cited

U.S. PATENT DOCUMENTS 1,189,232  7/1916  Benjamin ............................ 242/312
4,750,684  6/1988  Morimoto ........................... 242/310
5,127,603  7/1992  Morimoto ........................... 242/310

FOREIGN PATENT DOCUMENTS 2-81172  6/1990  Japan .
3-83065  8/1991  Japan .

Primary Examiner—Daniel P. Stodola
Assistant Examiner—William A. Rivera
Attorney, Agent, or Firm—Dickstein Shapiro Morin & Oshinsky LLP

[57] ABSTRACT

A baitcasting reel has right and left frames, a spool disposed between the right and left frames, a handle attached to one of the frames for driving the spool, and a thumb rest mounted on the frames to be pivotable about an axis extending in a right and left direction. Each frame includes a frame member opposed to the spool, and a case extending over an outer side of the frame member. The case and thumb rest are pivotable about the same axis, and overlap each other in plan view. The case and thumb rest are pivotable in different regions to avoid mutual interference.

24 Claims, 8 Drawing Sheets

BAITCASTING REEL HAVING A PIVOTABLE THUMB REST

This application is a continuation of application Ser. No. 08/130,455, filed Oct. 1, 1993, now abandoned.

BACKGROUND OF THE INVENTION

1. Field of the Invention

This invention relates to a baitcasting reel having right and left frames, a spool disposed between the right and left frames, a handle attached to one of the frames for driving the spool, and a thumb rest mounted on the frames to be pivotable about an axis extending in a right and left direction. More particularly, the invention relates to a technique of opening and closing the thumb rest.

2. Description of the Related Art

A baitcasting reel having a thumb rest openable and closable in the manner noted above is disclosed in Japanese Utility Model Publication Kokai No. 3-83065, for example. In this prior baitcasting reel, the thumb rest is formed integral with a cover extending over an outer face of the frame not having the handle. This case is pivotable about an axis disposed in a front position of the reel, so that the thumb rest may be opened and closed together with the case.

According to this prior construction, the side face of the frame may be opened to facilitate an operation to adjust a brake mechanism or the like. Besides, after a backlash, the user may open the thumb rest to extricate entanglement of the fishing line caused by the backlash. This construction has a further advantage of allowing the user to pass the fishing line through a level wind mechanism with ease.

In time of actual fishing, this type of reel is used in a fishing mode to cast a bait such as a lure. This fishing mode requires the braking force of the brake mechanism to be adjusted each time the bait is changed. It is also necessary frequently to extricate entanglement of the fishing line due to backlash.

With the above prior reel, however, when the case is opened to adjust the braking force of the brake mechanism, the user cannot grip the reel with his or her thumb placed on the thumb rest since the thumb rest also is opened. When the thumb rest is opened in order to extricate entanglement of the fishing line due to a backlash, the case also is opened to be obstructive to an operation to pull out the fishing line, for example. Thus, the prior reel has room for improvement.

Certain types of commercially available reels have a construction in which the case is attachable and detachable by turning a plurality of screws. Although this construction, when combined with a pivotable thumb rest, eliminates the above-noted inconveniences, it still requires an operation to turn the screws to open the case. Further, the case, when opened, is completely detached from the reel body, which presents an additional trouble in handling.

SUMMARY OF THE INVENTION

The object of the present invention is to provide a baitcasting reel having a thumb rest openable to allow the fishing line to be passed through the level wind mechanism with ease, and a case to be opened also with ease.

The above object is fulfilled, according to the present invention, by a baitcasting reel comprising, as noted in the outset hereof, right and left frames, a spool disposed between the right and left frames, a handle attached to one of the frames for driving the spool, and a thumb rest mounted on the frames to be pivotable about an axis extending in a right and left direction, wherein at least one of the frames includes a frame member opposed to the spool, and a case extending over an outer side of the frame member, the case being pivotable about the axis and overlapping the thumb rest in plan view, the case and the thumb rest being pivotable in different regions to avoid mutual interference.

The above features may be arranged as shown in FIGS. 1 through 6, for example. One of thumb rest 18 and case 9 may be opened while the other is maintained in a closed position. The fishing line wound on a spool 3 may be pulled out while the thumb rest 18 and case 9 remain supported by the reel body instead of being detached therefrom. With the case 9 openable through pivotal movement about the same axis X, the thumb rest 18 may be maintained in the closed position to enable the user to grip the reel with his or her thumb placed on the thumb rest 18. In this state, access may be made through an opening exposed by the pivotal movement of the case 9 to carry out a desired operation with ease, such as adjusting a brake mechanism mounted inside or to change the spool.

According to this construction, different regions of pivotal movement are provided for the thumb rest 18 and case 9. Consequently, the thumb rest 18 and case 9 may be opened at the same time without mutual interference.

It is thus possible to use the same pivot pin for pivotably supporting the thumb rest and case. This realizes simplification of the construction and a reduction in the number of components based on the shared use.

Thus, the present invention provides an improved baitcasting reel having a thumb rest openable to allow entanglement of the fishing line due to a backlash to be extricated with ease, and to allow the fishing line to be passed through the level wind mechanism with ease. This reel also has a case openable to allow access to the interior to carry out desired operations. The thumb rest and case may be opened with ease and independently of each other.

In a further aspect of the invention, a baitcasting reel comprises right and left frames, a spool disposed between the right and left frames, a handle attached to one of the frames for driving the spool, and a thumb rest mounted on the frames to be pivotable about a first axis extending in a right and left direction, wherein at least one of the frames includes a frame member opposed to the spool, and a case extending over an outer side of the frame member, the case being pivotable about a second axis extending in the right and left direction, the case overlapping the thumb rest in plan view, the first axis and the second axis being distributed to a front position and a rear position across a central position of the frames, the case and thumb rest being pivotable in different regions to avoid mutual interference.

The above features may be arranged as shown in FIGS. 7 and 8, for example. One of thumb rest 18 and case 9 may be opened while the other is maintained in a closed position. The fishing line wound on the spool 3 may be pulled out while the thumb rest 18 and case 9 remain supported by the reel body instead of being detached therefrom. With the case 9 openable through pivotal movement about the second axis Y, the user may grip the reel with his or her thumb placed on the thumb rest 18. In this state, access may be made through an opening exposed by the pivotal movement of the case 9 to carry out a desired operation with ease, such as adjusting a brake mechanism mounted inside.

According to this construction, the first axis and the second axis are distributed to a front position and a rear position. Consequently, the user may grip the central position of the reel to prevent opening of the thumb rest 18 and case 9, thereby using the reel in a steady way.

In a still further aspect of the invention, a baitcasting reel comprises right and left frames, a spool disposed between the right and left frames, a handle attached to one of the frames for driving the spool, and a thumb rest mounted on the frames to be pivotable about a first axis extending in a right and left direction, wherein at least one of the frames includes a frame member opposed to the spool, and a case extending over an outer side of the frame member, the case being pivotable about a second axis extending in the right and left direction, the case overlapping the thumb rest in plan view, the first axis and the second axis being distributed to a front position and a rear position across a central position of the frames, the case and the thumb rest being pivotable in opposite directions to avoid mutual interference.

The above features may be arranged as shown in FIG. 10, for example. The thumb rest 18 is openable by pivotal movement away from the case 9, while the case 9 is openable by pivotal movement away from the thumb rest 18. Thus, the thumb rest 18 and case 9 may be opened without mutual interference. For extricating entanglement of the fishing line due to a backlash, the fishing line may be pulled out easily without being obstructed by the case 9. The brake mechanism may be adjusted by opening the case 9 without being obstructed by the thumb rest 18.

According to this construction, even where the thumb rest 18 and case 9 have mutually overlapping regions of pivotal movement, the thumb rest 18 and case 9 are openable independently of each other and without interference by pivoting in the opposite directions.

This construction has the advantage of allowing the thumb rest and case to make pivotal movement independently of each other without securing separate regions of pivotal movement thereof.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Embodiments of the present invention will be described in detail with reference to the drawings.

Figure 4:
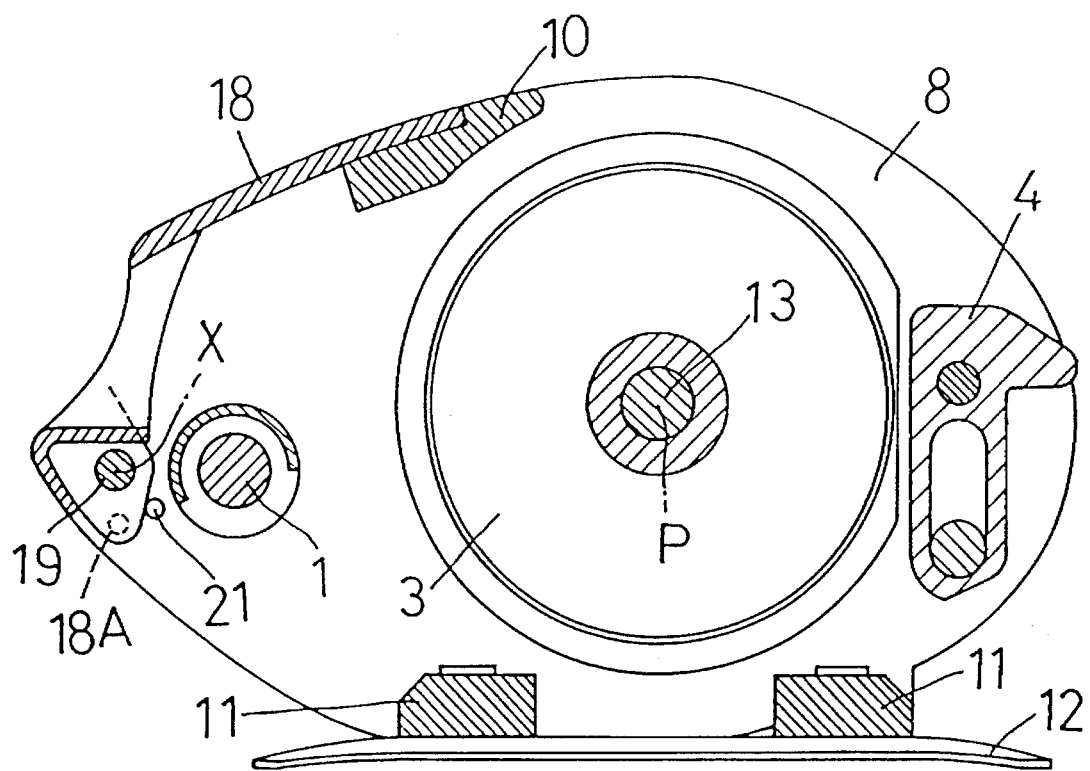
FIG. 4 is a side view in vertical section of the reel body.
Figure 6:
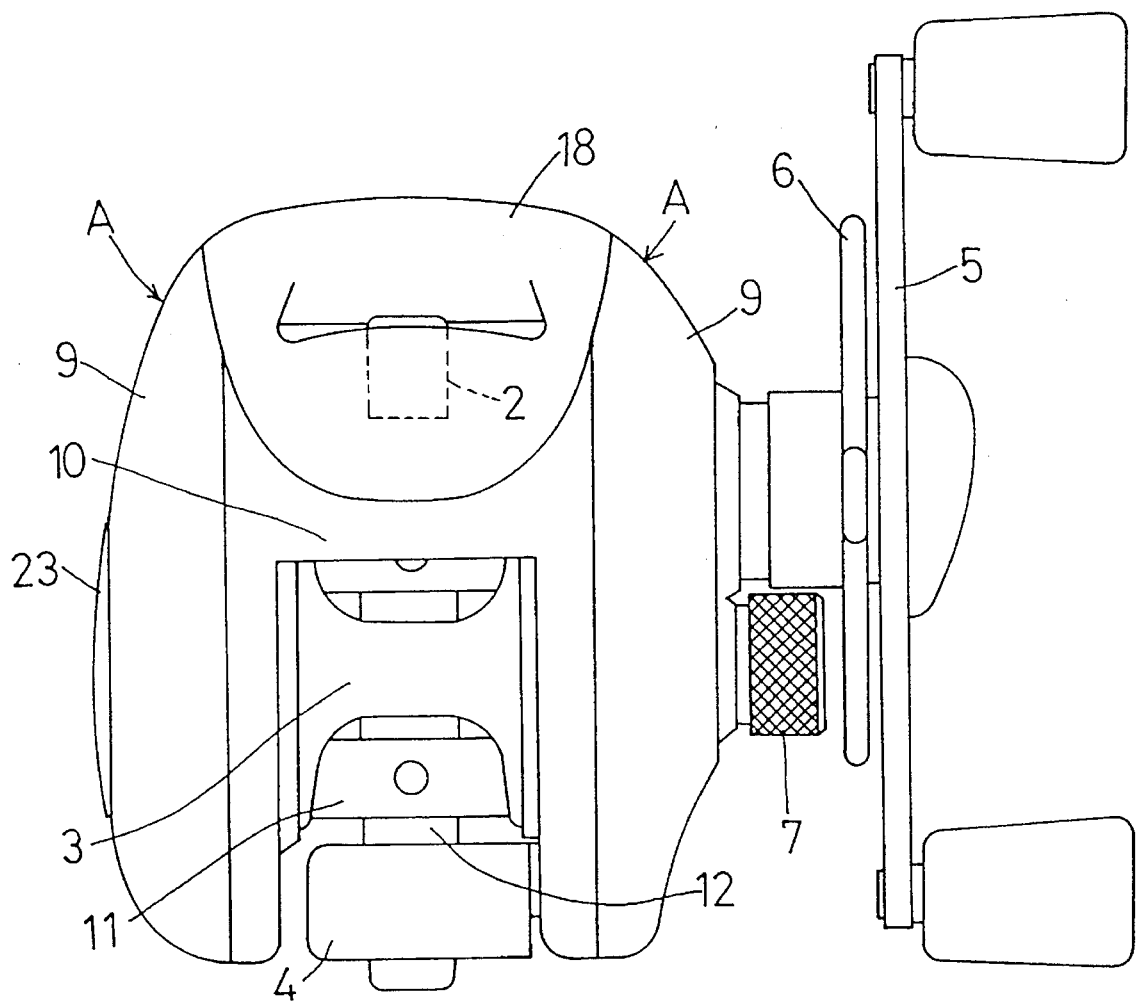
FIG. 6 is a plan view of a baitcasting reel having the reel body shown in FIG. 1.

FIGS. 4 and 6 show a baitcasting reel in one embodiment of the invention. The reel has a level wind mechanism mounted in a front position between right and left frames A. The level wind mechanism includes a screw shaft 1, and a line guide 2 reciprocable right and left with rotation of the screw shaft 1. Further, the reel has a spool 3 mounted centrally thereof and a clutch controller 4 mounted in a rear position. The right frame A supports a handle 5, a drag controller 6 and a cast controller 7.

As shown in FIGS. 1 through 4, each of the right and left frames A includes an inner frame member 8, and a case 9 extending over an outer side of the inner frame member 8. The right and left inner frame members 8 are formed integral with a top frame 10 disposed in an upper position, and a pair of front and rear lower frames 11 arranged in lower positions. A mounting foot 12 extends between the lower frames 11.

The spool 3 is rotatable with a spool shaft 13 supported at opposite ends thereof by the right and left frames A. The left frame A contains a centrifugal brake mechanism including collars 16 slidably mounted on pins 15 extending from a holder 14 attached to the spool shaft 13, and an annular braking element 17 for contacting the collars 16 when the spool 3 is rotated.

A thumb rest 18 is disposed in a front position of the reel to overlie an upper part of the top frame 10. The thumb rest 18 is pivotable between a closed position and an open position about an axis X of a pivot pin 19 disposed in a front position of the reel. The left case 9 is movable away from the frame member 8 and openable and closable through pivotal movement about the axis X of the pivot pin 19.

The pivot pin 19 is axially slidably supported by the right and left frame members 8. The pivot pin 19 has a left end thereof fixed to the left case 9, and a spring 20 is mounted on the pivot pin 19 to bias the case 9 away from the left frame member 8.

Figure 5:
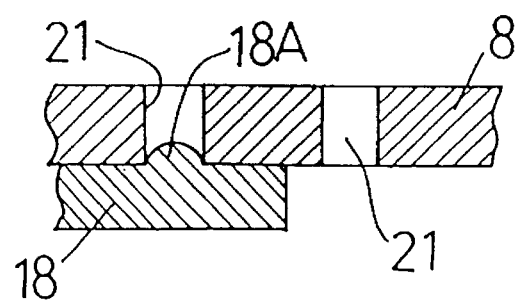
FIG. 5 is a sectional view of a position retaining mechanism of the thumb rest.

As shown in FIGS. 4 and 5, the thumb rest 18 defines a projection 18A engageable with recesses 21 formed in an inner surface of the frame member 8. The thumb rest 18 is retainable in the closed position and open position through engagement between the projection 18A and recesses 21.

The braking element 17 is supported by a disk 22 connected to a rotatable element 23. These elements are rotatable about an axis P of the spool shaft 13. The disk 22 has a screw 22S defined at one end thereof for separably meshing with a screw 8S formed in the left frame member 8. A spring 24 is provided to displace the disk 22 and rotatable element 23 away from the frame member 8 when the screws 8S and 22S are disconnected. The rotatable element 23 includes a knob 26 pivotable about an axis 25 to switch between an operative position and a contained position. The rotatable element 23 further includes a lock element 27 (whose control system is not particularly described) for engaging a geared recess 9A defined in an opening of the case 9 when the knob 26 is set to the contained position.

Figure 2:
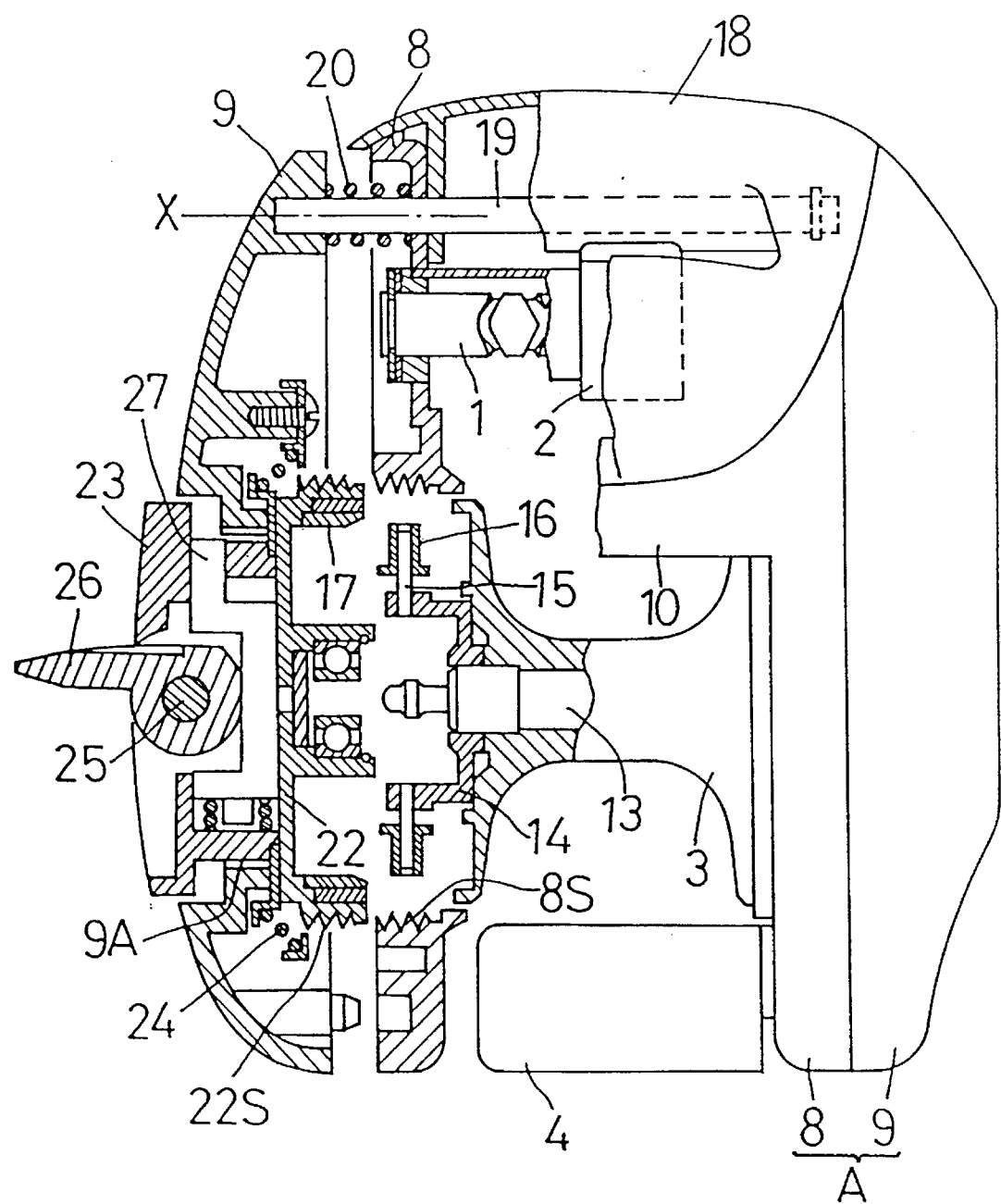
FIG. 2 is a plan view, partly in section, of the reel body with a cover separated therefrom.
Figure 3:
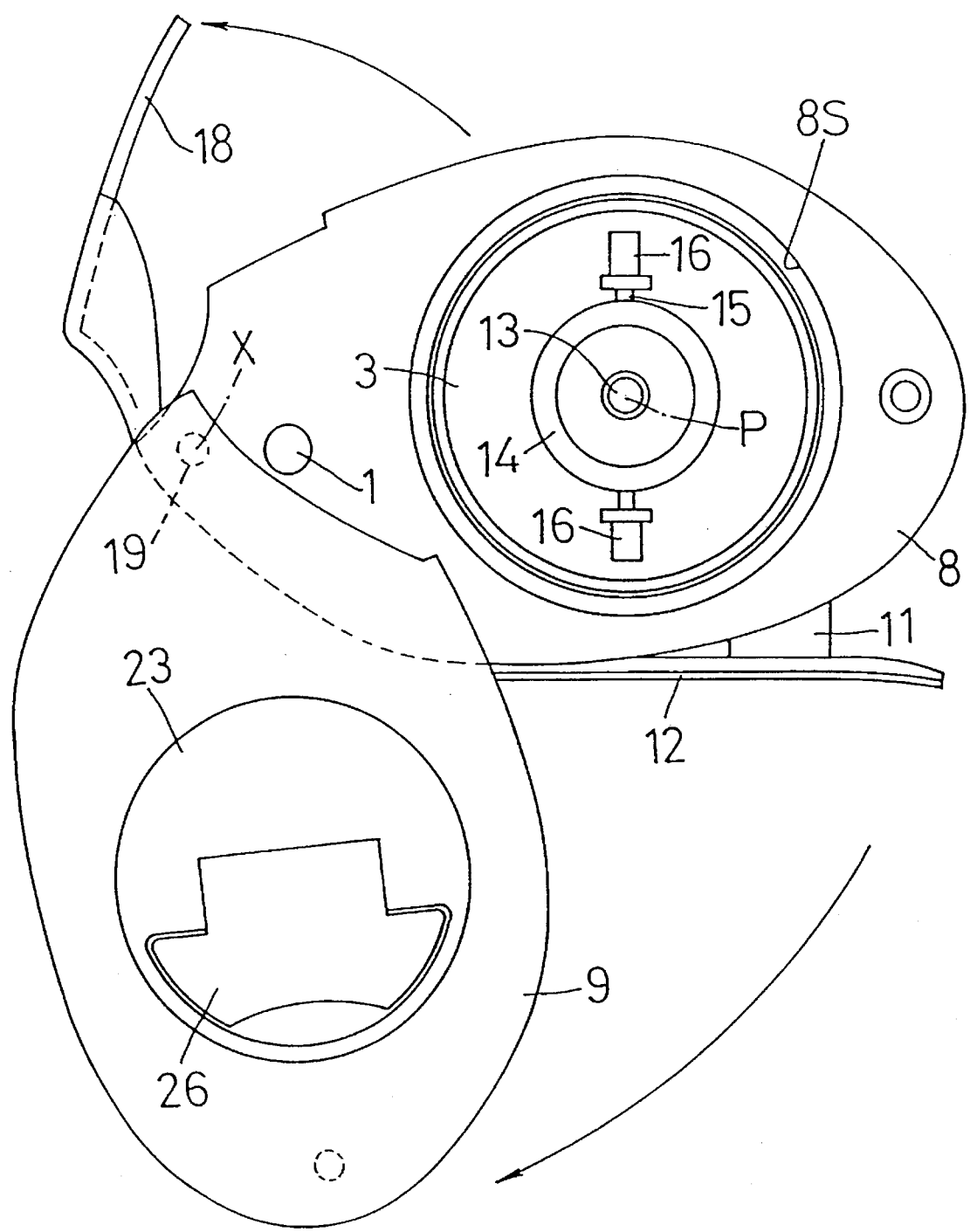
FIG. 3 is a side view of the reel body with a thumb rest and the cover opened.

For opening the case 9, the user sets the knob 26 to the operative position, and grips and turns the knob 26 in a direction to loosen the screws 8S and 22S. As a result, as shown in FIG. 2, the disk 22 is separated from the frame member 8, and the case 9 is displaced away from the frame member 8 under the biasing force of spring 24. In this position, the case 9 is pivotable about the axis X of the pivot pin 19.

As noted hereinbefore, the thumb rest 18 and case 9 are pivotable about the same axis to be opened and closed. Different pivoting regions are provided for the thumb rest 18 and case 9 to be openable and closable without interfering with each other.

Specifically, when the thumb rest 18 is closed, lateral portions of the thumb rest 18 cover small areas of upper surfaces of the right and left cases 9. whereby the thumb rest 18 is independently openable and closable. The left lateral portion of the thumb rest 18 covers an amount of the left case 9 smaller than an amount of displacement of the left case 9 away from the frame member 8. Consequently, the case 9 may be opened independently without interfering with the thumb rest 18.

For straightening a backlash of the fishing line, only the thumb rest 18 may be opened through pivotal movement about the axis X, whereby the user may pull out the fishing line wound on the spool 3. The case 9 may be opened without moving the thumb rest 18 from the closed position. Thus, the user may grip the reel with his or her thumb placed on the thumb rest 18, to change the collars 16 of the brake mechanism or pull out the spool 3 along the axis P through an opening revealed after the pivotal movement of the case 9.

The above embodiment may be modified such that the thumb rest and case are pivotably supported on separate pivot pins aligned to each other.

Another embodiment will be described next.

Figure 7:
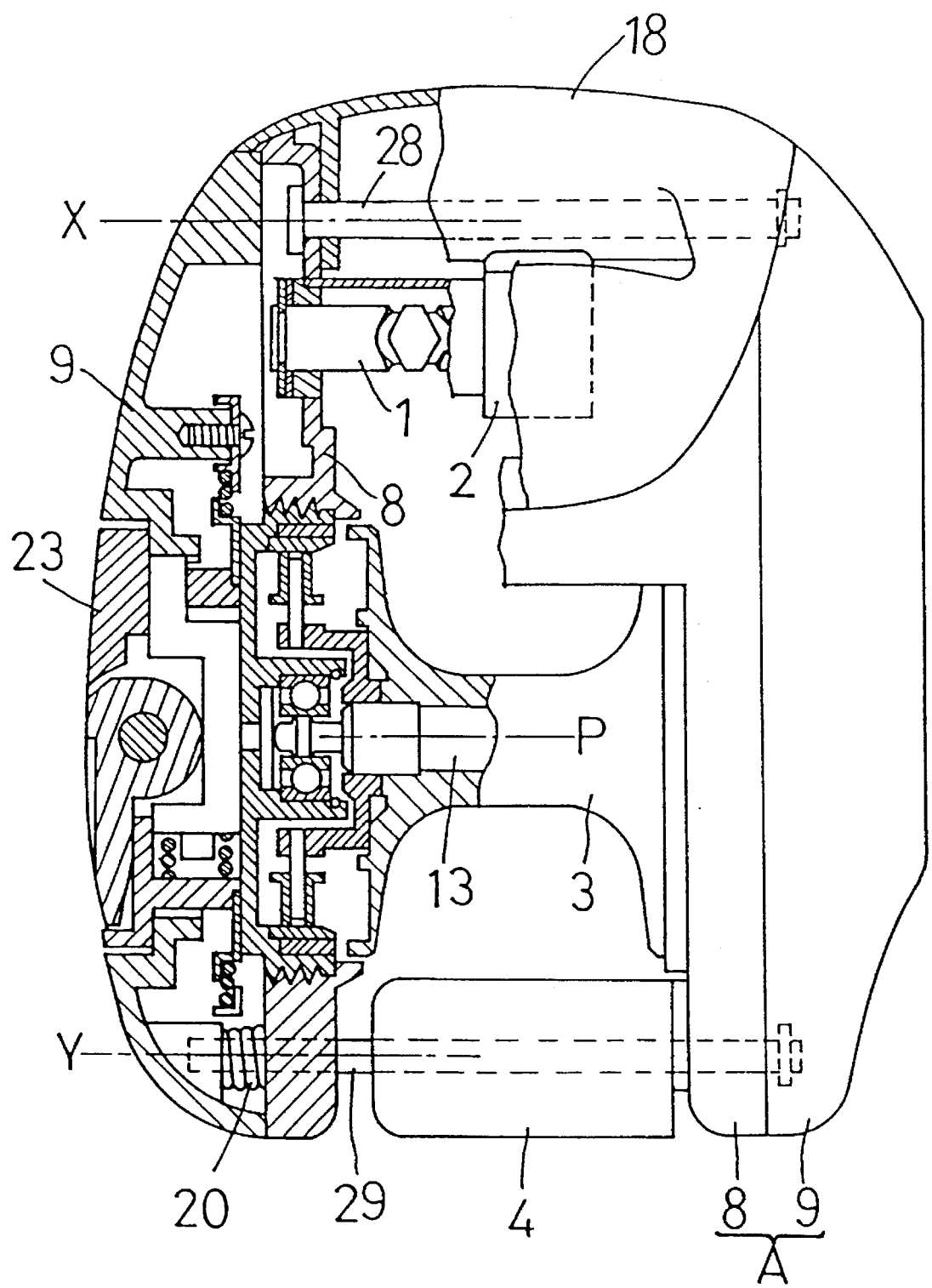
FIG. 7 is a plan view, partly in section, of a reel body in a different embodiment of the invention.
Figure 8:
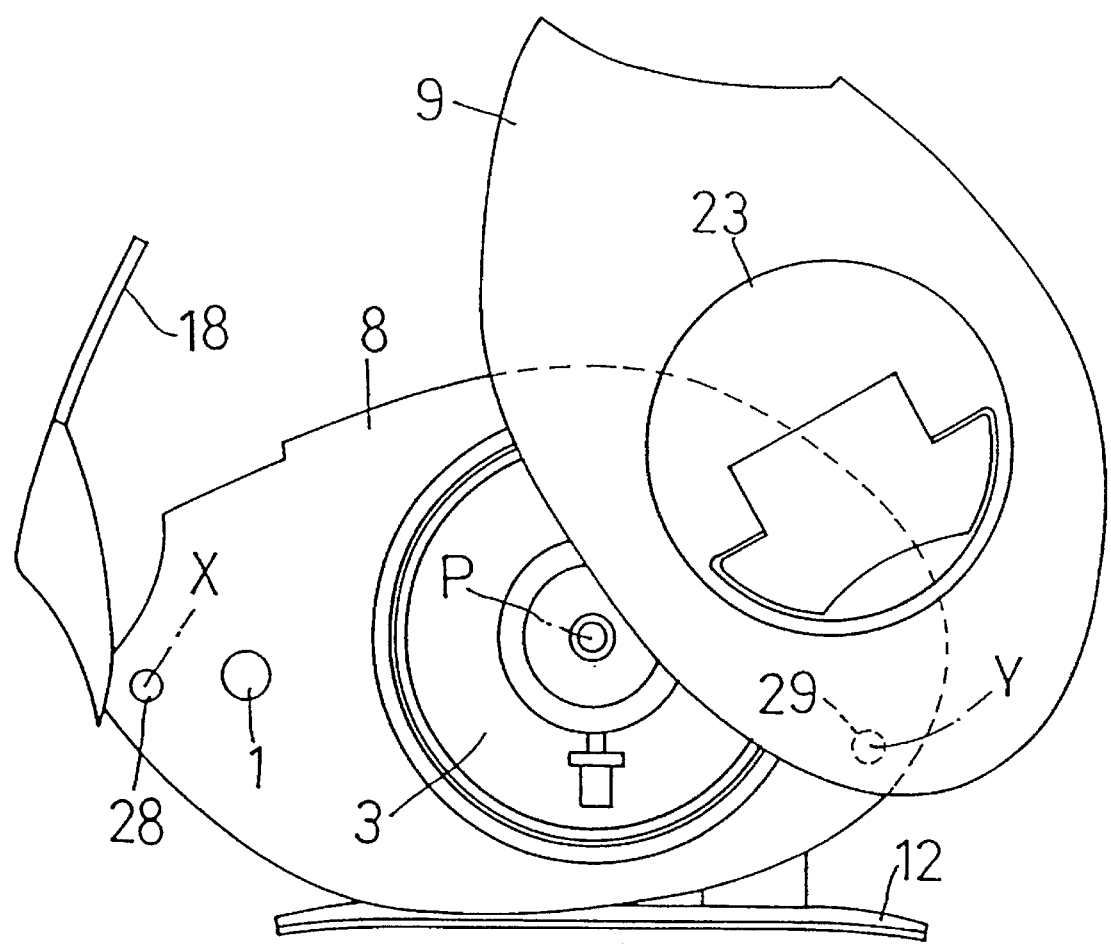
FIG. 8 is a side view of the reel body shown in FIG. 7, with a thumb rest and a cover opened.

As shown in FIGS. 7 and 8, this embodiment has the same basic construction as the foregoing embodiment. That is, the two embodiments are different in the constructions for opening and closing the thumb rest 18 and case 9 (like reference numbers being used to identify like elements in both embodiments).

In this reel, the thumb rest 18 is pivotable about an axis X while the case 9 is pivotable about an axis Y, the two axes X and Y being distributed to a front position and a rear position across the central position of the frames A. As in the foregoing embodiment, when the thumb rest 18 is closed, lateral portions of the thumb rest 18 cover small areas of upper surfaces of the right and left cases 9, such that the thumb rest 18 is independently openable and closable. The left lateral portion of the thumb rest 18 covers an amount of the left case 9 smaller than an amount of displacement of the left case 9 away from the frame member 8. Consequently, the case 9 may be opened independently without interfering with the thumb rest 18.

In this embodiment, the thumb rest 18 is supported on a first pivot pin 28. The first pivot pin 28 is not axially movable. The case 9 is supported on a second pivot pin 29. The second pivot pin 29 is axially displaceable.

Figure 9:
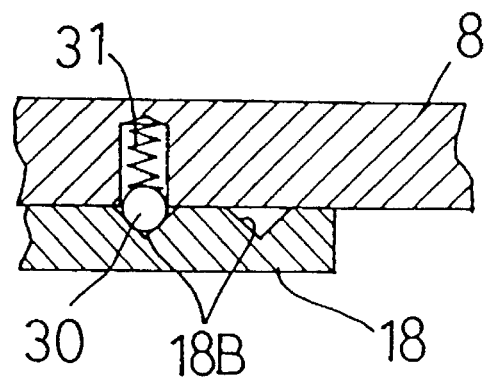
FIG. 9 is a sectional view of a position retaining mechanism of the thumb rest in the reel body shown in FIG. 7.

As shown in FIG. 9, the frame member 8 includes a ball 30 fitted in an inner surface thereof and biased to a projecting position by a spring 31 to be engageable with a pair of recesses 18B formed in the thumb rest 18. Thus, the thumb rest 18 is retainable in the closed position and open position.

For extricating entanglement of the fishing line caused by a backlash, only the thumb rest 18 may be opened through pivotal movement about the axis X, whereby the user may pull out the fishing line wound on the spool 3. The case 9 may be opened without moving the thumb rest 18 from the closed position. Thus, the user may grip the reel with his or her thumb placed on the thumb rest 18, to change the collars 16 of the brake mechanism or pull out the spool 3 along the axis P through an opening revealed after the pivotal movement of the case 9.

The above embodiment may be modified such that the pivotal axis of the thumb rest is disposed in a rear position and the pivotal axis of the case in a front position.

Figure 10:
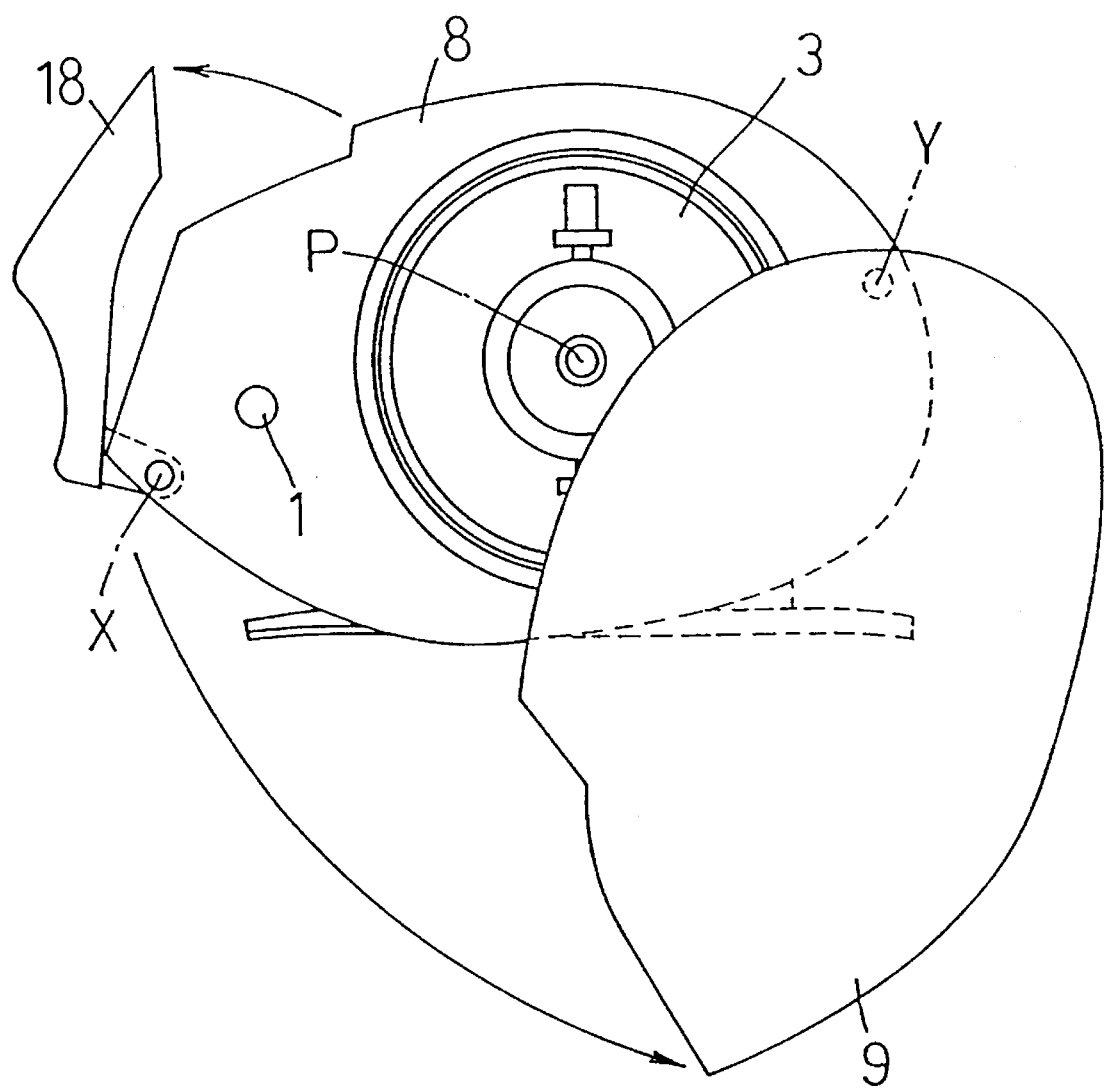
FIG. 10 is a side view of a reel body in a further embodiment of the invention, with a thumb rest and a cover opened.

A further embodiment will be described with reference to FIG. 10.

Figure 1:
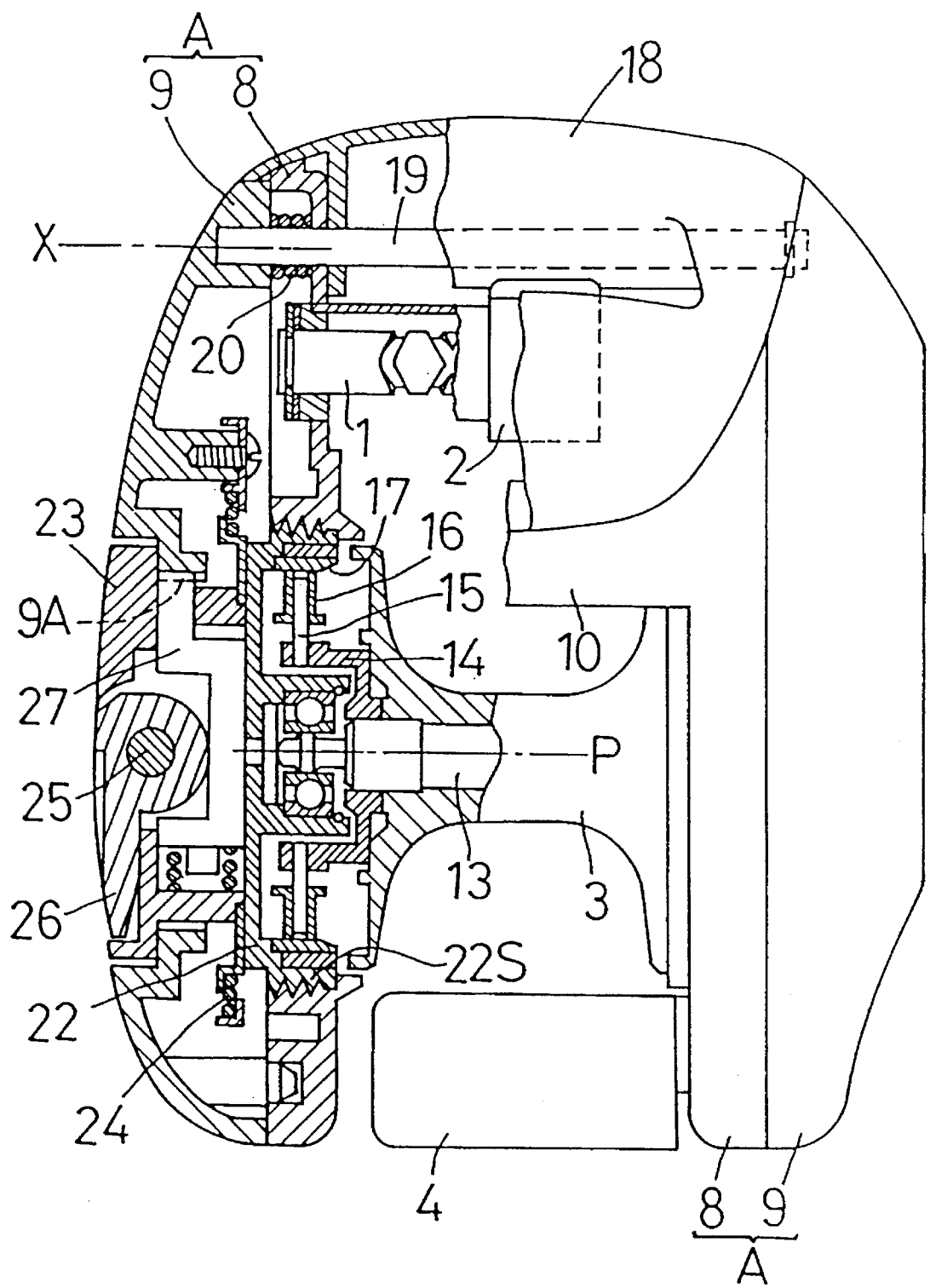
FIG. 1 is a plan view, partly in section, of a reel body according to the present invention.

As seen, this embodiment has the same basic construction as the embodiment shown in FIG. 1. A difference lies in the constructions for opening and closing the thumb rest 18 and case 9 (like reference numbers being used to identify like elements in both embodiments).

In this reel, the thumb rest 18 is pivotable about an axis X disposed in a front position while the case 9 is pivotable about an axis Y disposed in a rear position. The thumb rest 18 and case 9 are pivotable in opposite directions. Thus, as shown in FIG. 10, the thumb rest 18 is openable by pivoting upward to avoid interference with the case 9. The case 9 may be opened by pivoting independently downward without interfering with the thumb rest 18.

In this reel, the thumb rest 18 and case 9 are pivotable in the same plane. This pivoting and opening structure readily allows operations to extricate entanglement of the fishing line caused by a backlash and to adjust the brake mechanism.

This embodiment may also be modified such that the thumb rest and case are pivotable on the same axis.

What is claimed is:

1. A baitcasting reel comprising:

right and left frame members;

a spool disposed between said right and left frame members, said spool having an axis;

a handle attached to one of said right and left frame members for driving said spool;

a thumb rest mounted on at least one of said right and left frame members, said thumb rest being pivotable about a first axis between a closed position and an open position; and a case extending over at least one of said right and left frame members, said case being pivotable about a second axis between a closed position and an open position; and wherein said thumb rest is independently pivotable between said closed position and said open position regardless of the position of said case.

2. A baitcasting reel as defined in claim 1, wherein said first axis and said second axis coincide with each other.

3. A baitcasting reel as defined in claim 2, wherein said first axis and said second axis are parallel to said spool axis.

4. A baitcasting reel as defined in claim 3, wherein said thumb rest covers a part of said case when both said thumb rest and said case are in their closed positions.

5. A baitcasting reel as defined in claim 4, wherein said case is displaceable along said second axis.

6. A baitcasting reel as defined in claim 5, wherein said case is pivotable without interfering with said thumb rest when said case is displaced away from said spool along said second axis.

7. A baitcasting reel as defined in claim 1, wherein said first axis and said second axis do not coincide with each other.

8. A baitcasting reel as defined in claim 7, wherein said thumb rest covers a part of said case when both said thumb rest and said case are in their closed positions.

9. A baitcasting reel as defined in claim 8, wherein said case is displaceable along said second axis.

10. A baitcasting reel as defined in claim 9, wherein said case is pivotable without interfering with said thumb rest when said case is displaced away from said spool along said second axis.

11. A baitcasting reel as defined in claim 7, wherein both said first axis and said second axis are parallel to said spool axis.

12. A baitcasting reel as defined in claim 11, wherein said first axis and said second axis are on opposite sides of said spool axis.

13. A baitcasting reel as defined in claim 12, wherein said first axis is offset from said spool axis in a forward direction, and said second axis is offset from said spool axis in a rearward direction.

14. A baitcasting reel as defined in claim 12, wherein the pivotal direction of said case from said closed position thereof to said open position thereof is different from the pivotal direction of said thumb rest from said closed position thereof to said open position thereof.

15. A baitcasting reel as defined in claim 12, wherein the pivotal direction of said case from said closed position thereof to said open position thereof is the same as the pivotal direction of said thumb rest from said closed position thereof to said open position thereof.

16. A baitcasting reel as defined in claim 15, wherein a part of a peripheral edge of said thumb rest contacts a part of a peripheral edge of said case in such manner that said parts of said thumb rest and said case form a substantially single exterior surface substantially without a gap when said thumb rest and said case are in said closed positions.

17. A baitcasting reel as defined in claim 1, wherein said frame members are integral with a top frame and a pair of lower frames.

18. A baitcasting reel as defined in claim 1, wherein said thumb rest includes a projection, and wherein said frame members that said thumb rest is mounted on include a pair of recesses engageable with said projection so that said thumb rest is retained in either said closed position or said open position.

19. A baitcasting reel as defined in claim 1, wherein said thumb rest includes a pair of recesses, and wherein said frame members that said thumb rest is mounted on include a ball urged by an elastic member toward said recesses; and wherein said ball is engageable with said recesses to retain said thumb rest in either said closed position or said open position.

20. A baitcasting reel comprising:

right and left frame members;

a spool disposed between said right and left frame members, said spool having an axis;

a handle attached to one of said right and left frame members for driving said spool;

a thumb rest mounted on at least one of said right and left frame members, said thumb rest being pivotable about a first axis between a closed position and an open position; and a case extending over at least one of said right and left frame members, said case being pivotable about a second axis between a closed position and an open position; and wherein said case is independently pivotable between said closed position and said open position regardless of the position of said thumb rest.

21. A baitcasting reel as defined in claim 20, wherein said first axis and said second axis coincide with each other.

22. A baitcasting reel as defined in claim 21, wherein said thumb rest covers a part of said case when both said thumb rest and said case are in their closed positions.

23. A baitcasting reel as defined in claim 20, wherein said first axis and said second axis do not coincide with each other.

24. A baitcasting reel comprising:

right and left frame members;

a spool disposed between said right and left frame members, said spool having an axis;

a handle attached to one of said right and left frame members for driving said spool;

a thumb rest mounted on at least one of said right and left frame members, said thumb rest being pivotable about a first axis between a closed position and an open position, said first axis being parallel to said spool axis; and a case extending over at least one of said right and left frame members, said case being pivotable about a second axis between a closed position and an open position, said second axis being parallel to said spool axis; and wherein said case is independently pivotable regardless of the position of said thumb rest and said thumb rest is independently pivotable regardless of the position of said case.

* * * * *